United States Patent [19]
Sakamoto et al.

[11] Patent Number: 5,887,110
[45] Date of Patent: *Mar. 23, 1999

[54] VIDEO DATA PLAYBACK SYSTEM USING EFFECTIVE SCHEME FOR PRODUCING CODED VIDEO DATA FOR FAST PLAYBACK MODE

[75] Inventors: Hideki Sakamoto; Tomoaki Kawaguchi, both of Saitamaken; Hideharu Suzuki, Tokyo; Tatsuo Mori, Chibaken; Hiroyuki Kimiyama, Saitamaken; Kazutoshi Nishimura, Tokyo; Kouichi Itoh, Kanagawaken; Mitsuru Maruyama, Tokyo; Hiroshi Sugiyama, Saitamaken; Akira Uemori, Tokyo; Kazuo Okada, Saitamaken, all of Japan

[73] Assignee: Nippon Telegraph & Telephone Corp., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 623,172

[22] Filed: Mar. 28, 1996

[30] Foreign Application Priority Data

Mar. 28, 1995 [JP] Japan .................................. 7-069036
Sep. 6, 1995 [JP] Japan .................................. 7-228808

[51] Int. Cl.⁶ .................................................. H04N 5/783
[52] U.S. Cl. .............................. 386/68; 386/82; 386/111
[58] Field of Search ............................ 386/6–8, 33, 45, 386/68–82, 109, 111–112, 125–126; H04N 5/92, 5/781, 5/783

[56] References Cited

U.S. PATENT DOCUMENTS

| | | |
|---|---|---|
| 5,377,051 | 12/1994 | Lane et al. .................................. 386/81 |
| 5,493,414 | 2/1996 | Inoue et al. .............................. 386/112 |
| 5,493,456 | 2/1996 | Augenbraun et al. .................. 386/112 |
| 5,537,215 | 7/1996 | Niimura et al. .......................... 386/68 |
| 5,543,932 | 8/1996 | Chang et al. .............................. 386/81 |
| 5,587,806 | 12/1996 | Yamada et al. ............................ 386/68 |
| 5,647,049 | 7/1997 | Odaka et al. ............................ 386/109 |

FOREIGN PATENT DOCUMENTS 63-310293  12/1988  Japan .
6-133262   5/1994   Japan .

*Primary Examiner*—Thai Tran
*Attorney, Agent, or Firm*—Banner & Witcoff Ltd

[57] ABSTRACT

A video data playback system for reproducing requested video data by switching coded video data to be reproduced between normal playback coded video data and fast playback coded video data according to a requested playback mode, where the normal playback coded video data are encoded by a first video coding scheme using both intra-frame coding and inter-frame coding, while the fast playback coded video data are encoded by a second video coding scheme using only intra-frame coding and having a playback bit rate and a frame rate identical to those of the normal playback coded video data. The normal playback coded video data can be obtained by encoding the original video data first, then the fast playback coded video data can be obtained by encoding selectively decoded normal playback coded video data. Alternatively, the normal and fast playback coded video data can be obtained by synchronizing start and end of encoding by the first video coding scheme and encoding by the second video coding scheme.

26 Claims, 8 Drawing Sheets

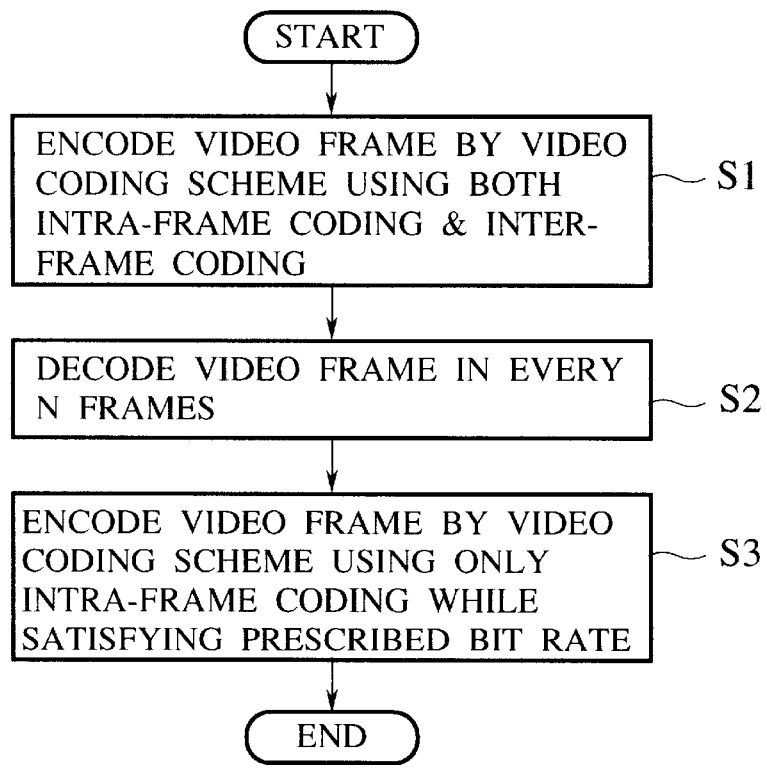
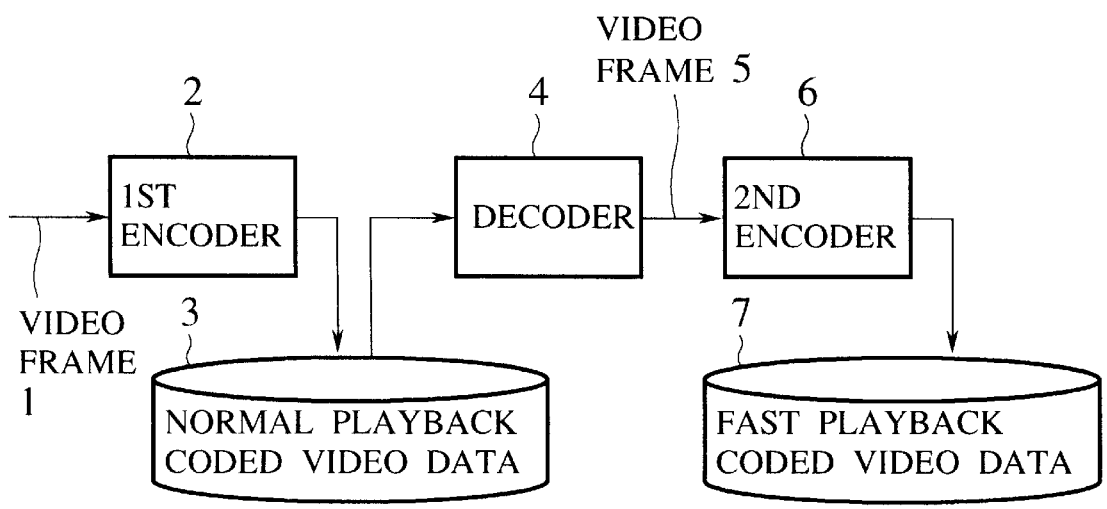

VIDEO DATA PLAYBACK SYSTEM USING EFFECTIVE SCHEME FOR PRODUCING CODED VIDEO DATA FOR FAST PLAYBACK MODE

BACKGROUND OF THE INVENTION

1. Field of the Invention

The present invention relates to a video data playback system capable of operating in a normal playback mode and a fast (forward and reverse) playback (visual search) mode, and more particularly, to a scheme for producing coded video data for the fast playback mode in this type of video data playback system, which can be utilized for video data input at a center (video server) of a video-on-demand (VOD) system to realize interactive video data playback between a center and a terminal via a communication channel, or for video data input at a stand-alone type video disk drive device.

2. Description of the Background Art

The video-on-demand service for providing video data is realized by connecting a video server for storing coded video data and a set-top device for reproducing video data from the coded video data via a communication path.

For this video-on-demand service, there is a proposition as disclosed in U.S. Pat. No. 5,479,303 for a scheme to realize a fast playback (visual search) mode similar to that provided in a usual VTR device, in which normal playback coded video data and fast playback coded video data are separately stored in advance in the video server, and coded video data to be used for video data reproduction are switched among these two types of coded video data whenever a normal playback request or a fast playback request is issued by the set-top device.

In a case of realizing this video-on-demand service with the fast playback mode, the normal playback coded video data are to be encoded by a video coding scheme using both intra-frame coding and inter-frame coding in view of the coding efficiency, whereas the fast playback coded video data are to be encoded by a video coding scheme using only the intra-frame coding that enables random access at any desired frame, because when the set-top device issues the fast playback request is not known in advance.

Now, in a video data playback system capable of operating in a normal playback mode and a fast (forward and reverse) playback (visual search) mode, the coded video data required in realizing the fast playback mode are to be produced by a coded video data production device and stored in a storage device such as a video server in advance.

In this regard, the conventionally known schemes for producing the fast playback coded video data are as follows.

A first conventional scheme is a scheme in which the same video source is reproduced at a normal speed by a normal playback device as well as at a fast speed by a fast playback device, and each video frame reproduced at a normal speed is encoded by an encoder for a normal playback mode so as to produce the normal playback coded video data, while each video frame reproduced at a fast speed is encoded by an encoder for a fast playback mode so as to produce the fast playback coded video data.

In other words, independent playback devices and independent encoders are provided for the normal playback and fast playback modes, and the normal playback coded video data are produced by the playback device and the encoder for a normal playback mode while the fast playback coded video data are produced by the playback device and the encoder for a fast playback mode, both from the same video source independently.

In this first conventional scheme, the normal playback coded video data and the fast playback coded video data are to be produced by independent processing systems, so that in principle it may become impossible to link these normal playback and fast playback coded video data properly when there is even a slight difference or variation in clocks of these two processing systems.

For example, if there is 1% error in clocks of these two processing systems, when the normal playback and fast playback coded video data for a video source with 100 minutes of reproduction time are produced by accurately aligning them at the beginning, there is going to be an error of one minute in links between them at the end of the video source. If there is a request for switch-over from the normal playback to the fast playback at this point, the playback point would be displaced by one minute when the playback mode is switched in response to the request.

In addition, in this first conventional scheme, there is a structural difficulty related to the fast playback device. Namely, the tape recording format used by a usual analog VTR presupposes a use of a normal playback, so that stripe like noises are often produced at a time of the fast playback, and in order to realize the video data playback without such noises even at a time of the fast playback, it is necessary for the playback device to have a special structural configuration for a noise reduction which is not provided in a usual playback device.

On the other hand, a second conventional scheme is a scheme which uses a configuration as shown in FIG. 1, in which each video frame is encoded by an encoder 42 to produce the normal playback coded video data 43 first, and then the normal playback coded video data 43 so obtained are entered into a filter 44 to extract only selected frames of the normal playback coded video data to produce the fast playback coded video data 45.

In this second conventional scheme, several problems arise when the encoder 42 employs a video coding scheme such as MPEG (Moving Picture Experts Group: ISO/IEC11172) which uses both the intra-frame coding and the inter-frame coding.

FIG. 2 shows an exemplary manner of producing the fast playback coded video data 45a in a case of using MPEG as the video coding scheme at the encoder 42.

Namely, each original video frame 41a is encoded by the encoder 42 to produce the normal playback coded video data 43a first. Here, a symbol such as I1, B2, P4, etc. shown in each frame of the normal playback coded video data 43a indicates a frame type and a number of frames from the top for each frame. For instance, I1 indicates that it is the coded data for I-frame which is the first frame from the top, B2 indicates that it is the coded data for B-frame which is the second frame from the top, P4 indicates that it is the coded data for P-frame which is the fourth frame from the top, and so on.

Note that the normal playback coded video data 43a encoded by MPEG include a coded frame data called I-frame which only contains data in an original frame and which is produced by the intra-frame coding, and coded frame data called B-frame and P-frame which contain data on difference between the original frame and the I-frame and which are produced by the inter-frame coding. Here, the I-frame can be decoded into the original frame from the coded frame data of this I-frame itself alone, but each of the P-frame and the B-frame cannot be decoded into the original frame without using the coded frame data of the I-frame.

Now, consider a case of producing the fast playback coded video data 45*a* from the normal playback coded video data 43*a* encoded by MPEG as described above. In the fast playback control using the fast playback coded video data 45*a*, when there is a fast playback request during the normal playback, it is necessary to realize the fast playback by switching the coded video data to be reproduced from the normal playback coded video data 43*a* at that point to a corresponding point of the fast playback coded video data 45*a*, so that it is necessary for the fast playback coded video data 45*a* to be capable of starting the fast playback from an arbitrary point.

For this reason, it is necessary to form the fast playback coded video data 45*a* by I-frames in which every frame is encoded by the intra-frame coding. In other words, the fast playback coded video data 45*a* are produced by extracting only I-frames by means of the filter 44.

Here, however, the I-frame is produced by using only the data in the original frame at a time of the encoding, so that its data size is considerably larger than that of the P-frame or the B-frame in general, and consequently the fast playback coded video data 45*a* so produced by extracting only the I-frames has a considerably larger data size per frame compared with the normal playback coded video data 43*a*.

For instance, when the data sizes for the same six frames are compared in FIG. 2, it can be seen that the fast playback coded video data 45*a* has about 2.5 times greater data size than the normal playback coded video data 43*a*. This implies that, if the normal playback and the fast playback are to be made by the same frame rate (i.e., a case of full motion fast playback) using the normal playback coded video data 43*a* and the fast playback coded video data 45*a*, the playback bit rate in a case of the fast playback would be 2.5 times as much as the playback bit rate in a case of the normal playback.

Such a difference in the playback bit rate depending on the playback mode can be very inconvenient in a case of constructing the video data playback device.

Namely, in a case of using a stand-alone type video data playback device such as a video disk drive device, for example the transfer bit rate from the video disk drive device is going to be different for the normal playback and the fast playback, so that it becomes necessary to provide an additional mechanism to control the rotational speed of the disk according to the playback mode.

Also, in a case of using the video-on-demand service system for providing the coded video data via a communication channel, it becomes necessary to provide a complicated communication channel resource management capable of dynamically changing the communication channel rate according to the playback mode.

Moreover, in order to cope with a case in which many terminals utilizing the video-on-demand service issue fast playback requests simultaneously, it is also necessary for a communication channel provider to provide extra channel resources in excess to the usual need.

Furthermore, in this second conventional scheme, the filter 44 for producing the fast playback coded video data 45*a* is required to extract the I-frames only, so that the fast playback speed to be realized by the fast playback coded video data 45*a* can be set only to an integer multiple of the I-frame interval in the normal playback coded video data 43*a*.

For example, in a case of FIG. 2, the I-frame appears in every six frames in the normal playback coded video data 43*a*, so that the six times faster playback is realized by extracting the I-frame from every six frames in a sequence of I1, I7, I13, and so on. In this case, the other possible settings of the fast playback speed are limited only to integer multiples of six, such as the twelve times faster playback that can be realized by extracting the I-frame from every twelve frames in a sequence of I1, I13, I25, and so on.

SUMMARY OF THE INVENTION

It is therefore an object of the present invention to provide a video data playback system and a scheme for producing coded video data for a fast playback mode in which the normal playback coded video data and the fast playback coded video data can be linked without a failure in principle.

It is another object of the present invention to provide a video data playback system and a scheme for producing coded video data for a fast playback mode which do not require a fast playback device with a special structural configuration for noise reduction.

It is another object of the present invention to provide a video data playback system and a scheme for producing coded video data for a fast playback mode which do not cause a change of the playback bit rate depending on the playback mode including the normal playback mode and the fast playback mode.

It is another object of the present invention to provide a video data playback system and a scheme for producing coded video data for a fast playback mode capable of setting the fast playback speed to be realized by the fast playback coded video data at arbitrary integer value times the normal playback speed.

It is another object of the present invention to provide a video data playback system and a scheme for producing coded video data for a fast playback mode capable of producing the fast playback coded video data without requiring a delay with respect to the production of the normal playback coded video data in principle.

According to one aspect of the present invention there is provided a method for producing fast playback coded video data for N times faster playback than a normal playback, where N is a natural number, for use in a video data playback system operable in a normal playback mode and a fast playback mode, the method comprising the steps of: (a) encoding each video frame of original video data by a first video coding scheme using both intra-frame coding and inter-frame coding, to obtain normal playback coded video data; (b) decoding each coded frame data in every N frames of the normal playback coded video data obtained at the step (a); and (c) encoding each video frame decoded at the step (b) by a second video coding scheme using only intra-frame coding, to obtain the fast playback coded video data satisfying a prescribed fast playback bit rate.

According to another aspect of the present invention there is provided an apparatus for producing fast playback coded video data for N times faster playback than a normal playback, where N is a natural number, for use in a video data playback system operable in a normal playback mode and a fast playback mode, the apparatus comprising: a first encoder for encoding each video frame of original video data by a first video coding scheme using both intra-frame coding and inter-frame coding, to obtain normal playback coded video data; a decoder for decoding each coded frame data in every N frames of the normal playback coded video data obtained by the first encoder; and a second encoder for encoding each video frame decoded at the decoder by a second video coding scheme using only intra-frame coding, to obtain the fast playback coded video data satisfying a prescribed fast playback bit rate.

According to another aspect of the present invention there is provided a method for producing fast playback coded video data for N times faster playback than a normal playback, where N is a natural number, for use in a video data playback system operable in a normal playback mode and a fast playback mode, the method comprising the steps of: (a) encoding each video frame of original video data by a first video coding scheme using both intra-frame coding and inter-frame coding, to obtain normal playback coded video data satisfying a prescribed normal playback bit rate; (b) selectively encoding each video frame in every N frames of the original video data by a second video coding scheme using only intra-frame coding, to obtain the fast playback coded video data satisfying a prescribed fast playback bit rate; and (c) synchronizing start and end of encoding at the step (a) and the step (b) so as to obtain the normal playback coded video data and the fast playback coded video data simultaneously.

According to another aspect of the present invention there is provided an apparatus for producing fast playback coded video data for N times faster playback than a normal playback, where N is a natural number, for use in a video data playback system operable in a normal playback mode and a fast playback mode, the apparatus comprising: a first encoder for encoding each video frame of original video data by a first video coding scheme using both intra-frame coding and inter-frame coding, to obtain normal playback coded video data satisfying a prescribed normal playback bit rate; a second encoder for selectively encoding each video frame in every N frames of the original video data by a second video coding scheme using only intra-frame coding, to obtain the fast playback coded video data satisfying a prescribed fast playback bit rate; and a control unit for synchronizing start and end of encoding by the first encoder and the second encoder so as to obtain the normal playback coded video data and the fast playback coded video data simultaneously.

According to another aspect of the present invention there is provided a method of video data playback in a video data playback system operable in a normal playback mode and a fast playback mode, the method comprising the steps of: (1) producing and storing normal playback coded video data encoded by a first video coding scheme using both intra-frame coding and inter-frame coding; (2) producing and separately storing fast playback coded video data for N times faster playback than a normal playback, where N is a natural number, which are encoded by a second video coding scheme using only intra-frame coding and having a playback bit rate and a frame rate identical to those of the normal playback coded video data produced and stored at the step (1); and (3) reproducing requested video data by switching coded video data to be reproduced between the normal playback coded video data produced and stored at the step (1) and the fast playback coded video data produced and stored at the step (2) according to a requested playback mode.

According to another aspect of the present invention there is provided a video data playback system operable in a normal playback mode and a fast playback mode, comprising: first means for producing and storing normal playback coded video data encoded by a first video coding scheme using both intra-frame coding and inter-frame coding; second means for producing and separately storing fast playback coded video data for N times faster playback than a normal playback, where N is a natural number, which are encoded by a second video coding scheme using only intra-frame coding and having a playback bit rate and a frame rate identical to those of the normal playback coded video data produced and stored by the first means: and third means for reproducing requested video data by switching coded video data to be reproduced between the normal playback coded video data produced and stored by the first means and the fast playback coded video data produced and stored by the second means according to a requested playback mode.

Other features and advantages of the present invention will become apparent from the following description taken in conjunction with the accompanying drawings.

BRIEF DESCRIPTION OF THE DRAWINGS

FIG. 3 is a flow chart of a procedure for producing fast playback coded video data according to the first embodiment of the present invention.

FIG. 4 is a schematic block diagram of a configuration for producing fast playback coded video data according to the first embodiment of the present invention.

DETAILED DESCRIPTION OF THE PREFERRED EMBODIMENTS

Figure 1:
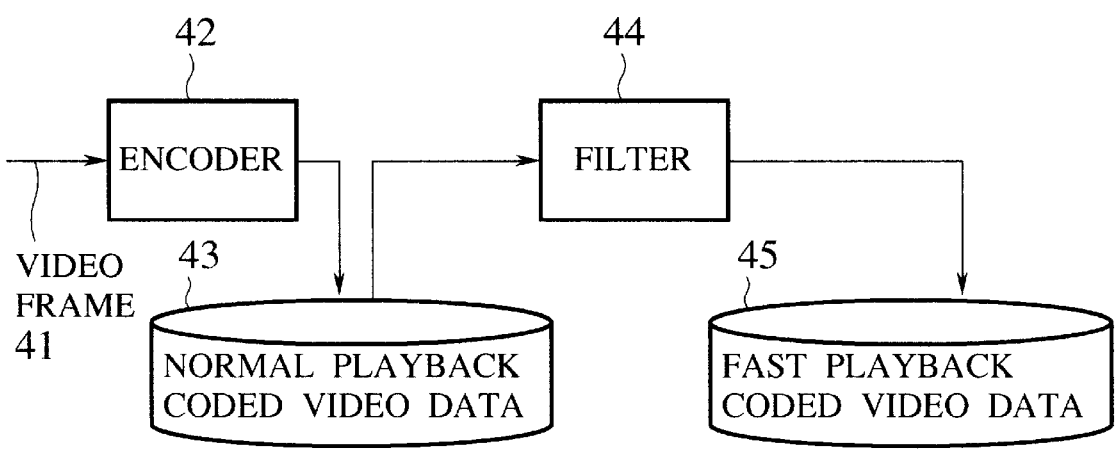
FIG. 1 is a schematic block diagram of one conventionally known configuration for producing fast playback coded video data.
Figure 2:
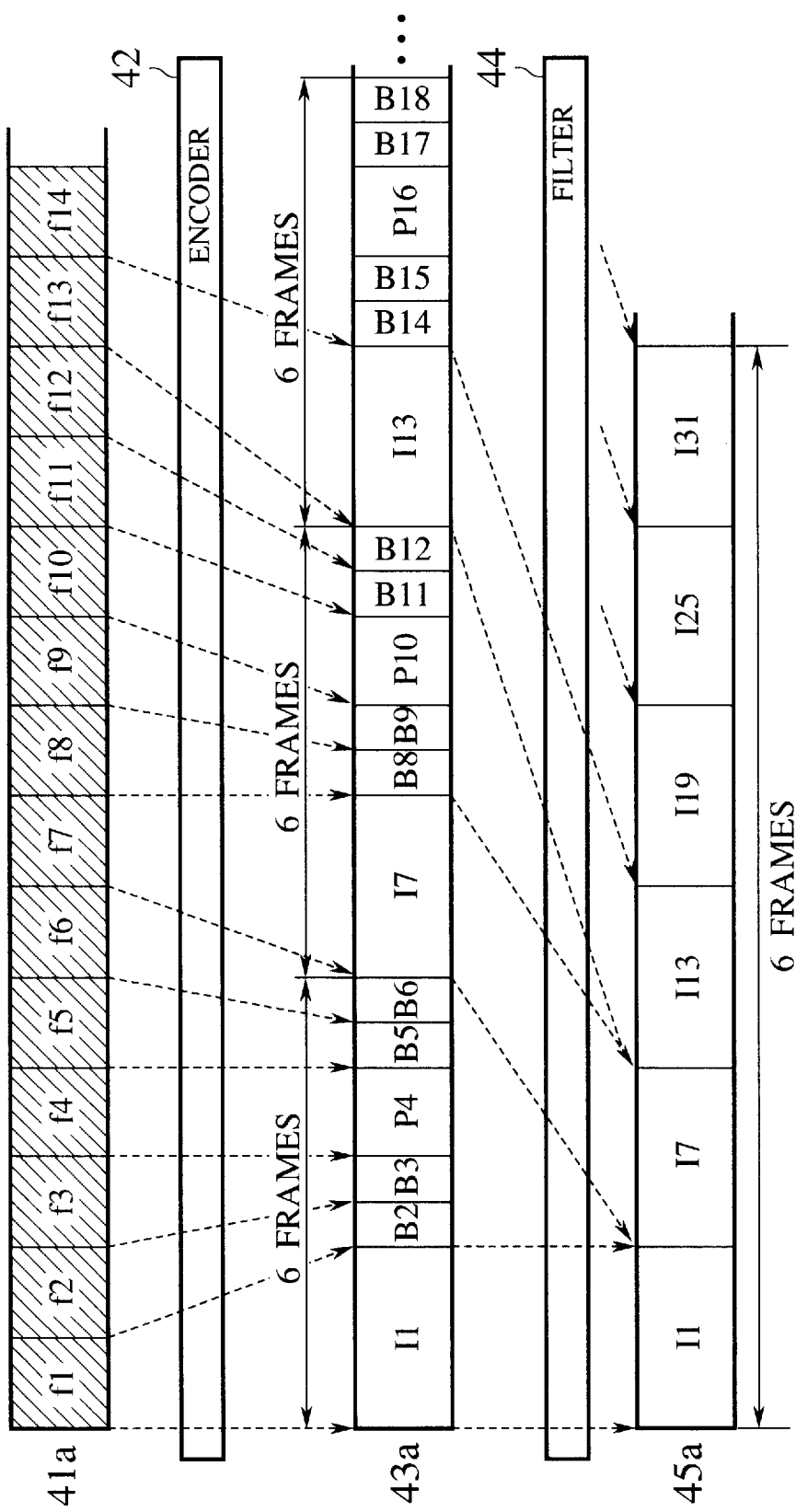
FIG. 2 is a diagram showing an exemplary case of producing fast playback coded video data in the configuration of FIG. 1.

Referring now to FIG. 3 to FIG. 6, the first embodiment of a video data playback system and a scheme for producing coded video data for a fast playback mode according to the present invention will be described in detail.

FIG. 3 shows a flow chart for a procedure to produce the fast playback coded video data in this first embodiment, which proceeds as follows.

First, each original video frame is encoded by a first video coding scheme using both the intra-frame coding and the inter-frame coding, similar to that used by MPEG in a case of using I-frames, P-frames and B-frames (step S1). The coded video data obtained at this step S1 are used as the normal playback coded video data.

Next, each video frame in every N frames of the normal playback coded video data obtained at the step S1 is decoded, where N is a natural number (step S2). In other words, starting from the first frame, the video frames with their serial orders in a sequence of:

1, 1+N, 1+2×N, 1+3×N, . . . , 1+K×N, . . .

sequentially decoded at the step S2.

Then, each video frame decoded at the step S2 is encoded by a second video coding scheme using only the intra-frame coding, similar to that used by MPEG in a case of using I-frames alone, in such a manner as to satisfy a prescribed bit rate (step S3). The coded video data obtained at this step S3 are used as the fast playback coded video data. More specifically, it is usually preferable to set the bit rate of the fast playback coded video data obtained at this step S3 equal to the bit rate of the normal playback coded video data obtained at the step S1. In the second video coding of this step S3, it is also possible to realize the video coding at a desired bit rate by controlling a number of quantization levels used at a time of encoding.

FIG. 4 shows a configuration of a fast playback coded video data production apparatus in this first embodiment. In this configuration of FIG. 4, a first encoder 2 encodes each entered video frame 1 by the first video coding scheme using both the intra-frame coding and the inter-frame coding to obtain the normal playback coded video data 3. Then, a decoder 4 decodes each video frame in every N frames (N is a natural number) of the normal playback coded video data 3, and a second encoder 6 encodes each decoded video frame 5 by the second video coding scheme using only the intra-frame coding to obtain the fast playback coded video data 7 in the required bit rate. In this configuration of FIG. 4, it is also possible to realize the video coding at a desired bit rate by controlling a number of quantization levels used at a time of encoding by the second encoder 6.

It is also possible to utilize the normal playback coded video data and the fast playback coded video data obtained by this first embodiment in constructing the video data playback system as disclosed in U.S. Pat. No. 5,479,303, the disclosure of which is incorporated herein by reference. In short, this video data playback system can be constructed by connecting a video server (a center) for storing coded video data and a set-top device (a user terminal) for reproducing video data from the coded video data via a communication path (a network), in which the normal playback coded video data and the fast playback coded video data obtained by this first embodiment are separately stored in advance in the video server, and coded video data to be used for video data reproduction are switched between these two types of coded video data whenever a normal playback request or a fast playback request is issued by the set-top device, so as to realize the fast playback (visual search) mode similar to that provided in a usual VTR device.

Note that, according to this first embodiment, the fast playback coded video data can have the identical playback bit rate and the frame rate as those of the normal playback coded video data, so that it is possible to realize the full motion fast playback mode in this video data playback system.

Figure 5:
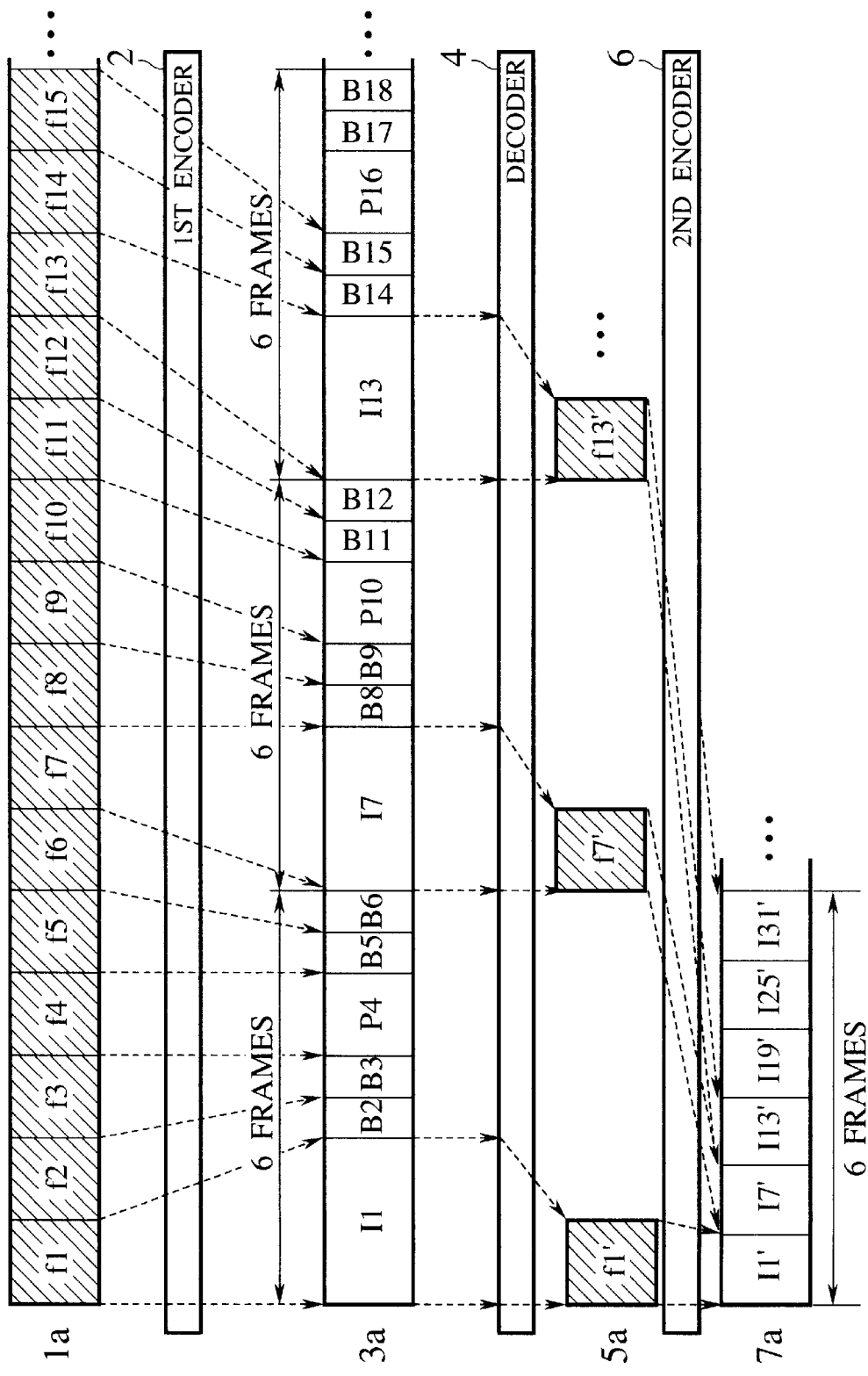
FIG. 5 is a diagram showing one exemplary case of producing fast playback coded video data in the configuration of FIG. 4.
Figure 6:
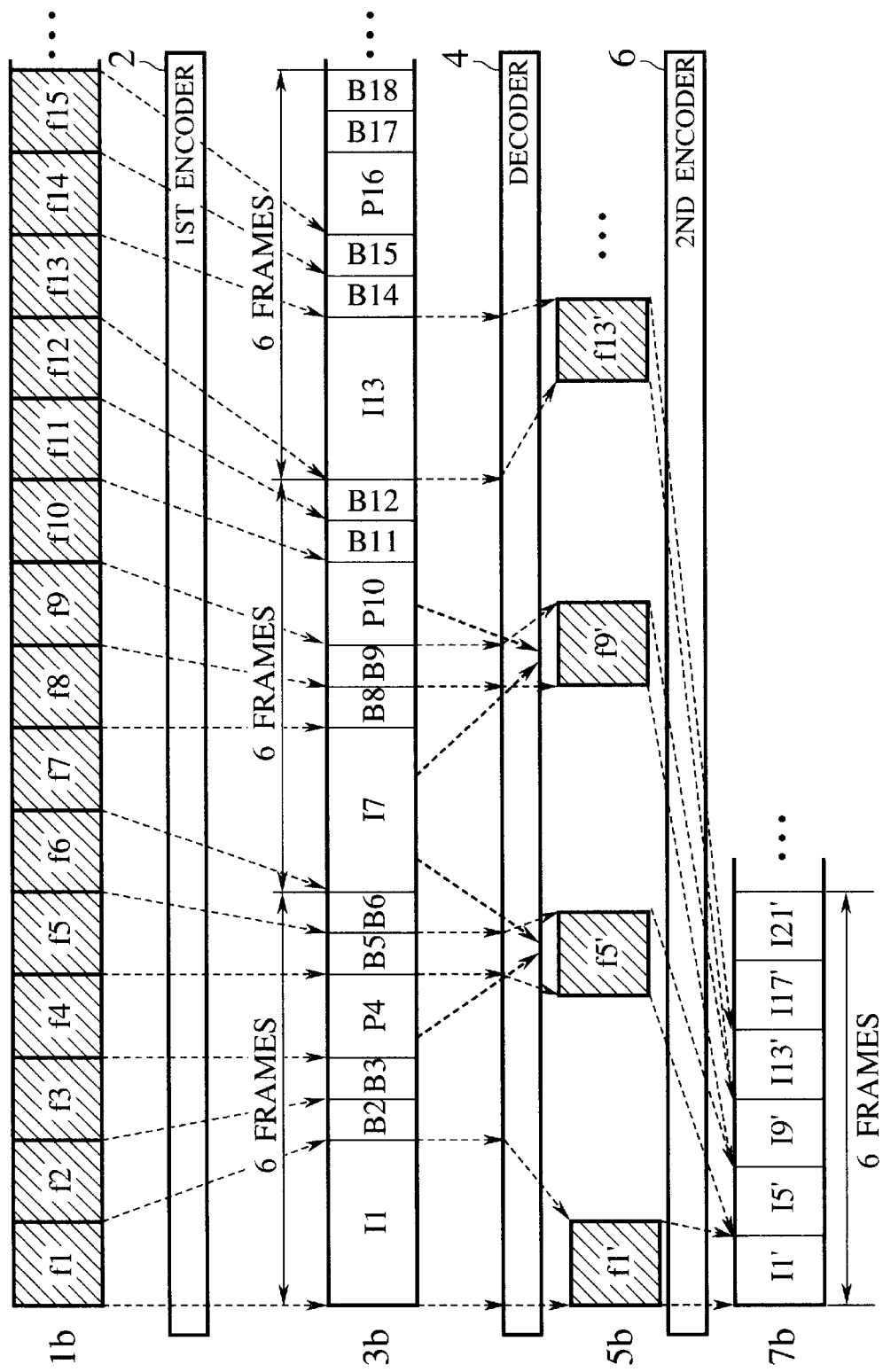
FIG. 6 is a diagram showing another exemplary case of producing fast playback coded video data in the configuration of FIG. 4.

FIG. 5 and FIG. 6 show exemplary manners for producing the fast playback coded video data in this first embodiment, where 1a and 1b indicate original video frames, 3a and 3b indicate the normal playback coded video data, 5a and 5b indicate decoded video frames, and 7a and 7b indicate the fast playback coded video data.

FIG. 5 shows an exemplary case of producing the fast playback coded video data 7a for six times faster playback from the normal playback coded video data 3a.

In this case, first, the normal playback coded video data 3a are obtained by encoding the original video frames 1a at the first encoder 2 by the first video coding scheme using both the intra-frame coding (I-frame) and the inter-frame coding (P-frame and B-frame). Next, each video frame in every six frames of the normal playback coded video data 3a is sequentially decoded at the decoder 4, in a sequence of I1, I7, I13, and so on, to obtain the decoded video frames 5a in a sequence of f1', f7', f13', and so on.

Then, each decoded video frame 5a is encoded at the second encoder 6 by the second video coding scheme using only the intra-frame coding (I-frame), to obtain the fast playback coded video data 7a in a sequence of I1', I7', I13', and so on. Here, the second encoder 6 has a specified parameter indicating that the bit rate of the fast playback coded video data 7a is to be set equal to that of the normal playback coded video data 3a. The coded data such as I1', I7' and I13' of the frames contained in the fast playback coded video data 7a are more compressed compared with the corresponding coded data such as I1, I7 and I13 of the frames contained in the normal playback coded video data 3a, so that the bit rate of the fast playback coded video data 7a is equal to that of the normal playback coded video data 3a. Note here that the adjustment of the bit rate at the second encoder 6 can be easily realized by adjusting a quantization level at a time of encoding.

FIG. 6 shows an exemplary case of producing the fast playback coded video data 7b for four times faster playback from the normal playback coded video data 3b.

In this case, first, the normal playback coded video data 3b are obtained by encoding the original video frames 1b at the first encoder 2 by the first video coding scheme using both the intra-frame coding (I-frame) and the inter-frame coding (P-frame and B-frame). Next, each video frame in every four frames of the normal playback coded video data 3b is sequentially decoded at the decoder 4, in a sequence of I1, B5, B9, I13, and so on, to obtain the decoded video frames 5b in a sequence of f1', f5', f9', f13', and so on. Here, the decoder 4 uses appropriate coded frame data necessary for decoding, such as P4 and I7 at a time of decoding B5, I7 and P10 at a time of decoding B9, and so on, according to the need.

Then, each decoded video frame 5b is encoded at the second encoder 6 by the second video coding scheme using only the intra-frame coding (I-frame), to obtain the fast playback coded video data 7b in a sequence of I1', I5', I9', I13', and so on. Here, the second encoder 6 has a specified parameter indicating that the bit rate of the fast playback coded video data 7b is to be set equal to that of the normal playback coded video data 3b. Similarly as in a case of the fast playback coded video data 7a of FIG. 5, the bit rate of the fast playback coded video data 7b is equal to that of the normal playback coded video data 3b. Note here that the adjustment of the bit rate at the second encoder 6 can be easily realized by adjusting a quantization level at a time of encoding.

As described, in this first embodiment, the coded data of the necessary frame extracted from the normal playback coded video data is decoded once, and then encoded again by an appropriate parameter, so that it is possible to realize an N times faster playback where N is an arbitrary integer, regardless of the configuration of I-frames, P-frames and B-frames in the normal playback coded video data.

According to this first embodiment, the fast playback coded video data are produced by extracting necessary frames from the normal playback coded video data, so that the normal playback coded video data and the fast playback coded video data can be linked without a failure in principle, and there is no need for a fast playback device with a special structural configuration for noise reduction.

Moreover, the coded data of the extracted frame is decoded once, and then encoded by an appropriate parameter, so that the bit rate for the fast playback does not increase even when the video coding scheme using the inter-frame difference is applied, and therefore it is possible to produce the fast playback coded video data without causing a change of the playback bit rate while it is possible to set the fast playback speed to be realized by the fast playback coded video data at arbitrary integer value times the normal playback speed.

Referring now to FIG. 7 to FIG. 12, the second embodiment of a video data playback system and a scheme for producing coded video data for a fast playback mode according to the present invention will be described in detail.

In the first embodiment described above, the encoding is carried out first, and the decoding in every N frames is carried out with respect to the output of the encoding, and then another encoding is carried out with respect to the output of the decoding. Consequently, the processing of the first embodiment described above requires a sequential operation, which cannot be parallelized in principle.

Consequently, the production of the fast playback coded video data is inevitably delayed by the time required for the decoding (decoding delay) and the time required for the second encoding (encoding delay) from the production of the normal playback coded video data, and such a delay of the fast playback coded video data production can be rather significant in some cases. For example, if each one of the encoding delay and the decoding delay takes 3 seconds, the production of the fast playback coded video data will be delayed by 6 seconds from the production of the normal playback coded video data.

In view of this fact, this second embodiment is directed to a video data playback system and a scheme for producing coded video data for a fast playback mode which are capable of producing the fast playback coded video data without requiring a delay with respect to the production of the normal playback coded video data in principle.

Figure 7:
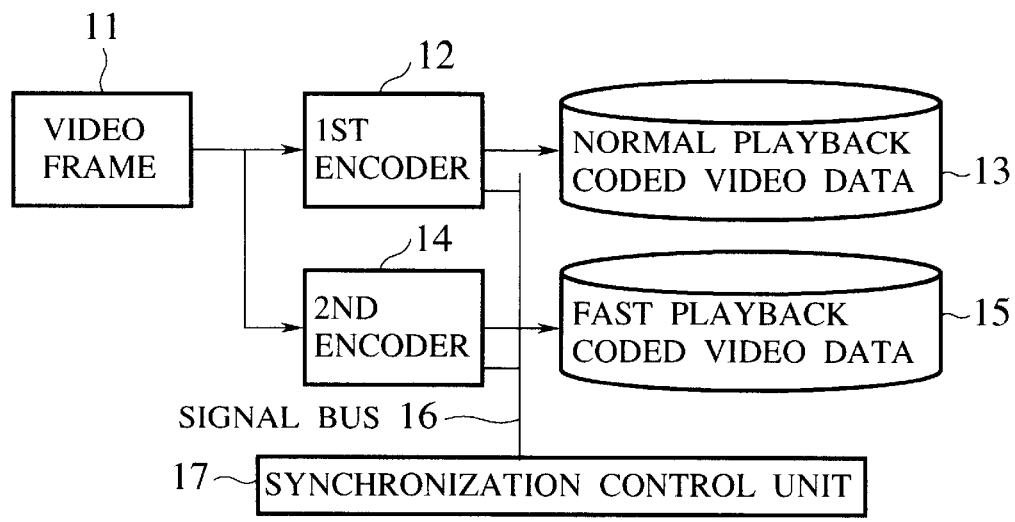
FIG. 7 is a schematic block diagram of a configuration for producing fast playback coded video data according to the second embodiment of the present invention.

FIG. 7 shows a configuration of a fast playback coded video data production apparatus in this second embodiment. In this configuration of FIG. 7, a first encoder 12 encodes each entered video frame 11 by the first video coding scheme using both the intra-frame coding and the inter-frame coding to obtain the normal playback coded video data 13 satisfying a prescribed normal playback bit rate. On the other hand, a second encoder 14 extracts each video frame in every N frames (N is a natural number) of the entered video frames 11 and encodes each extracted video frame by the second video coding scheme using only the intra-frame coding to obtain the fast playback coded video data 15 satisfying a prescribed fast playback bit rate, simultaneously as the first encoder 12 obtains the normal playback coded video data 13.

In addition, the first encoder 12 and the second encoder 14 are connected with a synchronization control unit 17 via a signal bus 16, and this synchronization control unit 17 controls the synchronization of starts and ends of the encoding operations at the first encoder 12 and the second encoder 14 by sending synchronization signals to indicate encoding start and end timings to the first encoder 12 and the second encoder 14 via the signal bus 16. As the start and the end of the encoding operations at the first encoder 12 and the second encoder 14 are synchronized in this manner, the normal playback coded video data and the fast playback coded video data can be linked without a failure in principle.

In this configuration of FIG. 7, it is also possible to realize the video coding at a desired bit rate by controlling a number of quantization levels used at a time of encoding by the second encoder 14 similarly as in the first embodiment described above.

Figure 8:
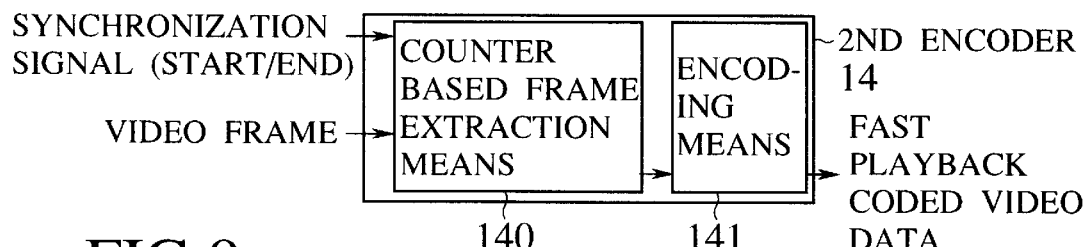
FIG. 8 is a schematic block diagram of one possible internal configuration for a second encoder in the configuration of FIG. 7.
Figure 9:
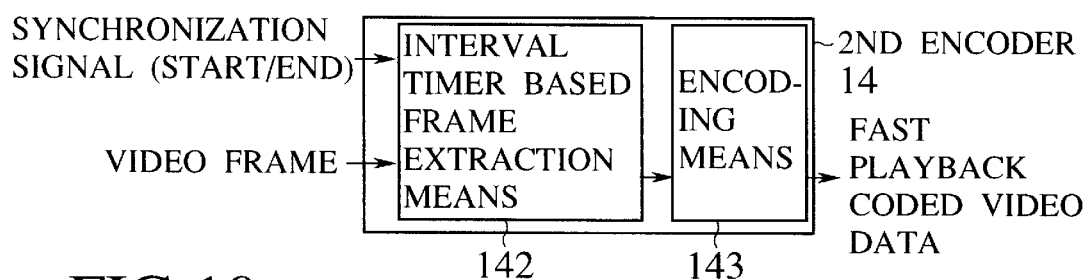
FIG. 9 is a schematic block diagram of another possible internal configuration for a second encoder in the configuration of FIG. 7.
Figure 10:
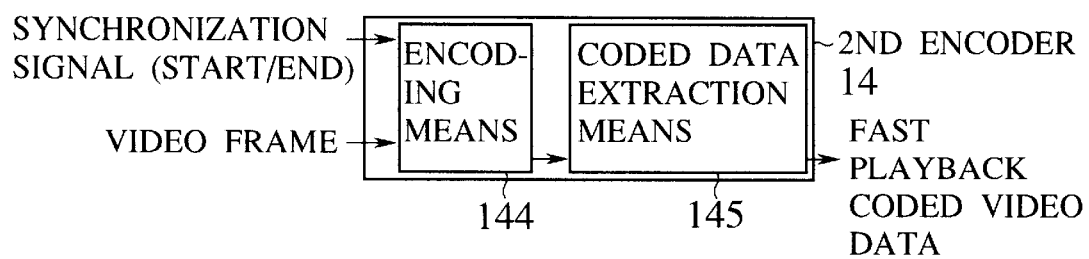
FIG. 10 is a schematic block diagram of still another possible internal configuration for a second encoder in the configuration of FIG. 7.

Here, the second encoder 14 can have any one of configurations shown in FIGS. 8, 9 and 10 internally.

In the internal configuration of FIG. 8, the second encoder 14 includes a counter based frame extraction means 140 for extracting each video frame in every N frames of the entered video frames 11 on a basis of a number of frames counted by a counter (not shown), and an encoding means 141 for encoding each extracted video frame by the second video coding scheme.

In the internal configuration of FIG. 9, the second encoder 14 includes an interval timer based frame extraction means 142 for extracting each video frame in every N frames of the entered video frames 11 on a basis of an interval timer (not shown), and an encoding means 143 for encoding each extracted video frame by the second video coding scheme.

In the internal configuration of FIG. 10, the second encoder 14 includes an encoding means 144 for encoding every frame of the entered video frames 11 by the second video coding scheme, and a coded data extraction means 145 for extracting each coded data in every N frames of the coded frame data obtained by the encoding means 144 according to a header information provided in each coded frame data.

Note that, in the configuration of FIG. 8, the synchronization signal is entered into the counter based frame extraction means 140 in order to control start and end of the extraction of appropriate video frames to be encoded by the encoding means 141. Similarly, in the configuration of FIG. 9, the synchronization signal is entered into the interval timer based frame extraction means 142 in order to control start and end of the extraction of appropriate video frames to be encoded by the encoding means 143. On the other hand, in the configuration of FIG. 10, the synchronization signal is entered into the encoding means 144 in order to control start and end of the encoding by the encoding means 144.

Figure 11:
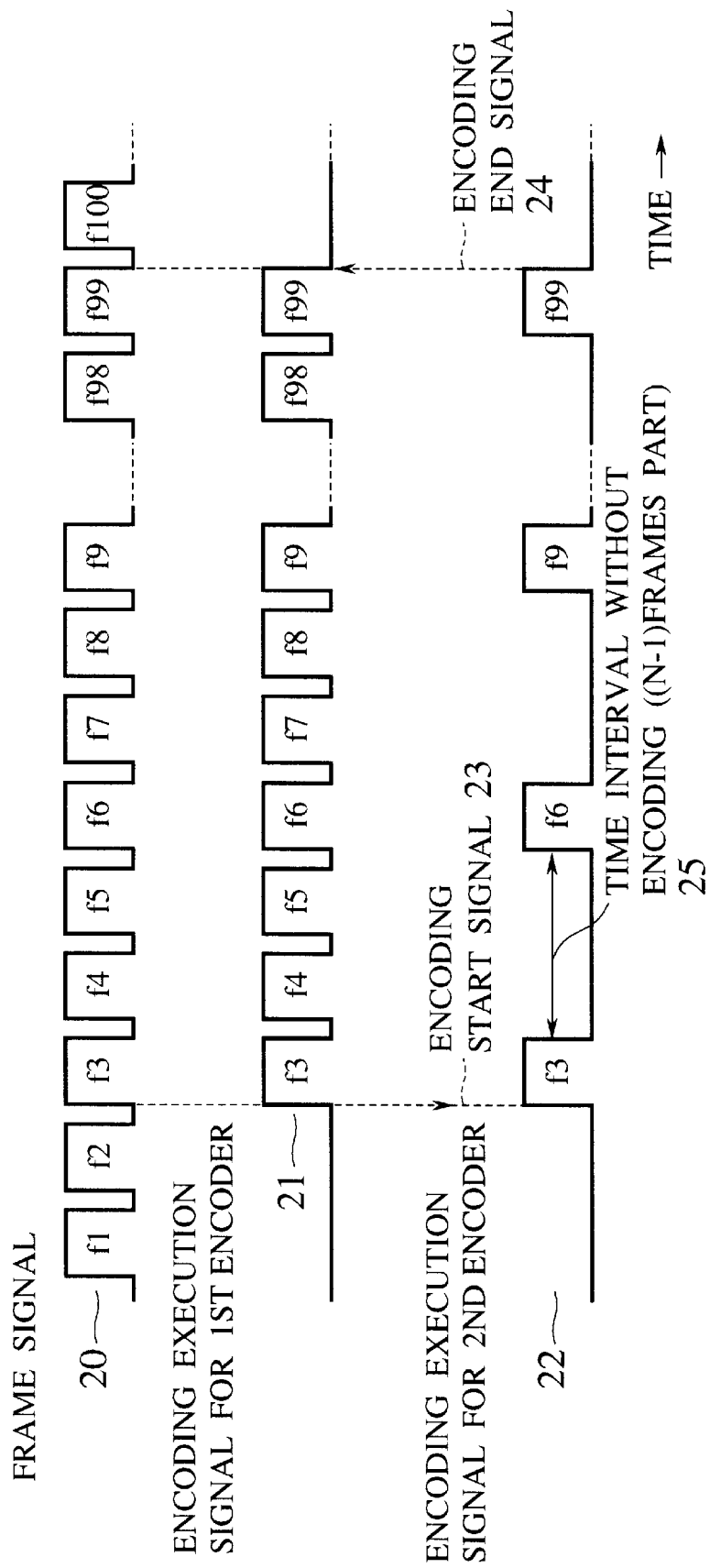
FIG. 11 is a timing chart showing an exemplary operation in the configuration of FIG. 7.

FIG. 11 shows a timing chart for the operation in the configuration of FIG. 7, in terms of a frame signal 20 indicating a presence of each frame in the entered video frames 11, an encoding execution signal 21 for the first encoder 12, an encoding execution signal 22 for the second encoder 14, an encoding start signal 23 for commanding a start of the encoding, and an encoding end signal 24 for commanding an end of the encoding.

The frame signal 20 is a signal which is in a high level whenever a frame exists, as in f1, f2, . . . , f100 shown in FIG. 11. On the other hand, each of the encoding execution signals 21 and 22 is a signal which is in a high level whenever a corresponding encoder is encoding a corresponding frame. For instance, the encoding execution signals 21 and 22 are both in a high level for the frame f3, implying that both the first encoder 12 and the second encoder 14 encoded the third video frame f3.

Now, consider a case in which the synchronization control unit 17 sends the encoding start signal 23 via the signal bus 16 at a start timing of the video frame f3, in accordance with a command for encoding start given from an external. In this case, upon receiving the encoding start signal 23, the first encoder 12 starts the encoding immediately, from the third video frame f3, so as to sequentially encode the video frames f3, f4, f5, and so on. At the same time, the second encoder 14 also receives the encoding start signal 23 via the signal bus 16 and starts the encoding immediately, from the third video frame f3. Here, however, the second encoder 14 does not carry out the encoding for a prescribed time interval 25 corresponding to (N−1) frames part after one frame is encoded, so as to realize the encoding of each frame in every N frames.

FIG. 11 shows an exemplary case of N=3, in which the second encoder 14 does not carry out the encoding for the video frames f4 and f5 after the video frame f3 is encoded, so as to realize the encoding of each frame in every three frames. Here, the timing for the time interval 25 without the encoding can be obtained by counting a number of frames of the entered video frames 11 inside the second encoder 14 using the configuration of FIG. 8 for example. Alternatively, as the entered video frames 11 are provided at constant interval, it is also possible to utilize the interval timer for measuring a certain time interval inside the second encoder 14 in the configuration of FIG. 9.

Next, suppose that a command for encoding end is given from an external at an end timing of the video frame f99. Then, the first encoder 12 ends the encoding at the 99-th video frame f99 upon receiving the encoding end signal 24 from the synchronization control unit 17 via the signal bus 16. At the same time, the encoding end signal 24 is also transmitted to the second encoder 14 via the signal bus 16, and the second encoder 14 also ends the encoding at the 99-th video frame f99 upon receiving the encoding end signal 24.

Figure 12:
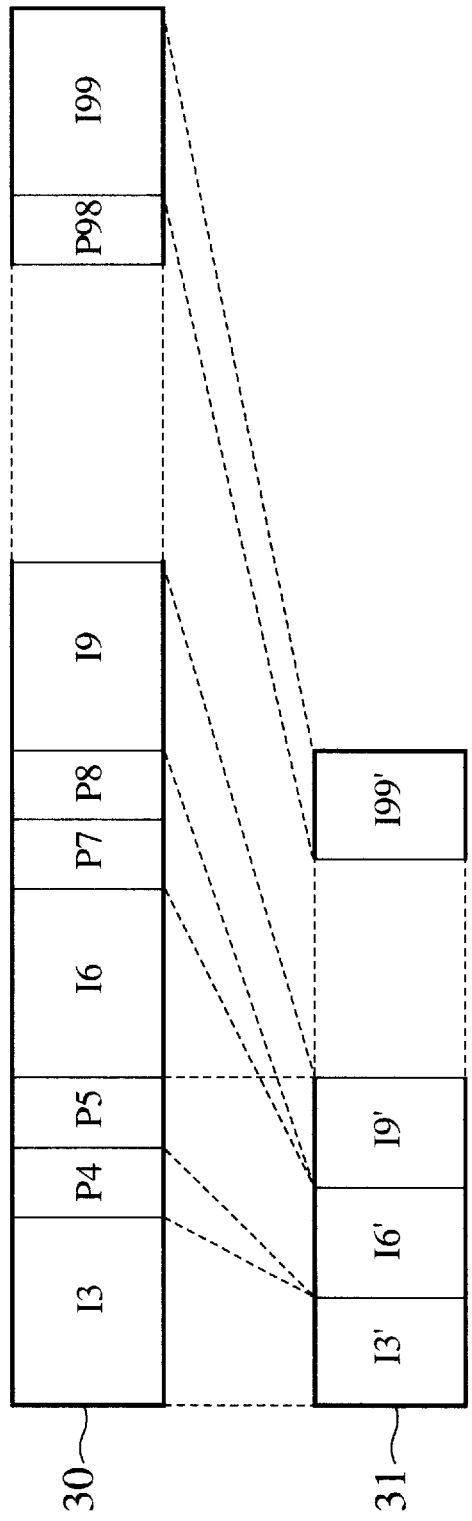
FIG. 12 is a diagram showing examples of normal playback coded video data and fast playback coded video data obtained in the configuration of FIG. 7.

FIG. 12 shows examples of the normal playback coded video data 30 produced by the first encoder 12 and the fast playback coded video data 31 produced by the second encoder 14.

Here, the normal playback coded video data 30 contain coded frame data I3, I6, I9, and so on which are obtained by applying the intra-frame coding on the original video frames f3, f6, f9, and so on, as well as coded frame data P4, P5, P7 and so on which are obtained by applying the inter-frame coding on the original video frames f4, f5, f7, and so on. On the other hand, the fast playback coded video data 31 contain coded frame data I3', I6', I9' and so on which are obtained by applying the intra-frame coding on the original video frames f3, f6, f9, and so on.

FIG. 12 shows examples in which the normal playback bit rate and the fast playback bit rate are set equal to each other, so that a data size for three frames of the coded frame data I3, P4 and P5 in the normal playback coded video data 30 coincides with a data size for three frames of the coded frame data I3', I6' and I9' in the fast playback coded video data 31.

The normal playback coded video data 30 are encoded by both the intra-frame coding and the inter-frame coding, so that a random access can be made only with respect to those frames which are encoded by the intra-frame coding, such as I3, I6, I9, and so on, but the image quality is superior to the coded data obtained by encoding all the frames by the intra-frame coding alone at the same bit rate.

On the other hand, the fast playback coded video data 31 are entirely encoded by the intra-frame coding alone. so that the overall image quality is inferior, but a random access starting from arbitrary frame can be made. Also, the normal playback coded video data 30 and the fast playback coded video data 31 have the identical playback bit rate, so that even when the coded data to be reproduced is switched in a middle of the video data reproduction, the load exerted on external devices such as the communication path and the set-top device will be unchanged. Moreover, a header section can be provided in each coded data of the normal playback coded video data 30 and the fast playback coded video data 31, and a management information to be included in this header section can contain information on correspondence between the coded frame data as shown in FIG. 12.

By means of these properties, it is possible in this second embodiment to realize the switch-over between the normal playback and the fast playback by switching the coded video data to be reproduced to an appropriate one of the normal playback coded video data 30 and the fast playback coded video data 31 whenever a normal playback request or a fast playback request is issued from an external device such as the set-top device.

For example, when there is a command for the fast playback from an external device during the normal playback of the coded frame data I3 of the normal playback coded video data 30, the playback point is shifted to the corresponding coded frame data I3' of the fast playback coded video data 31 and the fast playback coded video data 31 are sequentially reproduced in a sequence of I3', I6', I9', and so on, so as to provide the video data in the fast playback to this external device. Then, when there is a command for the normal playback from this external device during the fast playback of the coded frame data I6' of the fast playback coded video data 31, the playback point is shifted to the corresponding coded frame data I6 of the normal playback coded video data 30 and the normal playback coded video data are sequentially reproduced in a sequence of I6, I7, I8, and so on, so as to provide the video data in the normal playback to this external device.

Thus, using the normal playback coded video data 30 and the fast playback coded video data 31 obtained by this second embodiment, the external device can be provided with a function for switching the playback mode between the fast playback and the normal playback without changing the playback bit rate.

In this manner, it is possible to utilize the normal playback coded video data and the fast playback coded video data obtained by this second embodiment in constructing the video data playback system as disclosed in U.S. Pat. No. 5,479,303 quoted above. In short, this video data playback system can be constructed by connecting a video server (a center) for storing coded video data and a set-top device (a user terminal) for reproducing video data from the coded video data via a communication path (a network), in which the normal playback coded video data and the fast playback coded video data obtained by this second embodiment are separately stored in advance in the video server, and coded video data to be used for video data reproduction are switched between these two types of coded video data whenever a normal playback request or a fast playback request is issued by the set-top device, so as to realize the fast playback (visual search) mode similar to that provided in a usual VTR device.

Note that, according to this second embodiment, the fast playback coded video data can have the identical playback bit rate and the frame rate as those of the normal playback coded video data, so that it is possible to realize the full motion fast playback mode in this video data playback system.

It is to be noted that a case of using only one second encoder 14 for producing the fast playback coded video data is described above, but it is also possible to produce a plural sets of the fast playback coded video data for different fast playback speeds simultaneously by providing a plurality of second encoders with mutually different values set for the frame interval N to carry out the encoding.

It is also to be noted that a scheme for utilizing the time interval 25 without the encoding in the second encoder 14 is described above, but it is also possible to use a scheme using the configuration of FIG. 10 in which all the video frames are encoded by the intra-frame coding to obtain the coded frame data I3', I4', I5', and so on, and then only one coded frame data in every three frames is extracted to obtain the fast playback coded video data including the coded frame data I3', I6', I9', and so on. In this case, the coded frame data to be extracted can be selected by referring to a header information including a serial number of each coded frame data.

As described, according to this second embodiment, the processing of the first encoder and the processing of the second encoder are independent from each other, so that it becomes possible to provide a video data playback system and a scheme for producing coded video data for a fast playback mode which are capable of producing the fast playback coded video data without requiring a delay with respect to the production of the normal playback coded video data in principle.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for producing fast playback coded video data for N times faster playback than a normal playback, where N is a natural number, for use in a video data playback system operable in a normal playback mode and a fast playback mode, the method comprising the steps of:

(a) encoding each video frame of original video data by a first video coding scheme using both intra-frame coding and inter-frame coding, to obtain normal playback coded video data;

(b) decoding only each coded frame data in every N frames of the normal playback coded video data obtained at the step (a); and (c) encoding every video frame decoded at the step (b) by a second video coding scheme using only intra-frame coding, to obtain the fast playback coded video data satisfying a prescribed fast playback bit rate.

2. The method of claim 1, wherein the step (c) obtains the fast playback coded video data satisfying the prescribed fast playback bit rate by controlling a number of quantization levels used in encoding.

3. The method of claim 1, wherein the step (c) obtains the fast playback coded video data with a fast playback bit rate equal to a normal playback bit rate.

4. An apparatus for producing fast playback coded video data for N times faster playback than a normal playback, where N is a natural number, for use in a video data playback system operable in a normal playback mode and a fast playback mode, the apparatus comprising:

a first encoder for encoding each video frame of original video data by a first video coding scheme using both intra-frame coding and inter-frame coding, to obtain normal playback coded video data;

a decoder for decoding only each coded frame data in every N frames of the normal playback coded video data obtained by the first encoder; and a second encoder for encoding every video frame decoded at the decoder by a second video coding scheme using only intra-frame coding, to obtain the fast playback coded video data satisfying a prescribed fast playback bit rate.

5. The apparatus of claim 4, wherein the second encoder obtains the fast playback coded video data satisfying the prescribed fast playback bit rate by controlling a number of quantization levels used in encoding.

6. The apparatus of claim 4, wherein the second encoder obtains the fast playback coded video data with a fast playback bit rate equal to a normal playback bit rate.

7. A method for producing fast playback coded video data for N times faster playback than a normal playback, where N is a natural number, for use in a video data playback system operable in a normal playback mode and a fast playback mode, the method comprising the steps of:

(a) encoding each video frame of original video data by a first video coding scheme using both intra-frame coding and inter-frame coding, to obtain normal playback coded video data satisfying a prescribed normal playback bit rate;

(b) selectively encoding each video frame in every N frames of the original video data by a second video coding scheme using only intra-frame coding, to obtain the fast playback coded video data satisfying a prescribed fast playback bit rate; and (c) synchronizing start and end of encoding at the step (a) and the step (b) so as to obtain the normal playback coded video data and the fast playback coded video data simultaneously.

8. The method of claim 7, wherein the step (b) extracts each video frame in every N frames of the original video data first, and then encodes each extracted video frame by the second video coding scheme.

9. The method of claim 8, wherein the step (b) extracts each video frame in every N frames of the original video data on a basis of a number of entering frames counted in an encoder for applying the second video coding scheme.

10. The method of claim 8, wherein the step (b) extracts each video frame in every N frames of the original video data on a basis of a prescribed time interval measured in an encoder for applying the second video coding scheme.

11. The method of claim 7, wherein the step (b) encodes all video frames of the original video data by the second video coding scheme first, and then extracts each coded frame data in every N frames according to a header information provided in each coded frame data.

12. The method of claim 7, wherein the step (b) obtains the fast playback coded video data satisfying the prescribed fast playback bit rate by controlling a number of quantization levels used in encoding.

13. The method of claim 7, wherein the step (b) obtains the fast playback coded video data with a fast playback bit rate equal to a normal playback bit rate of the normal playback coded video data obtained by the step (a).

14. An apparatus for producing fast playback coded video data for N times faster playback than a normal playback, where N is a natural number, for use in a video data playback system operable in a normal playback mode and a fast playback mode, the apparatus comprising:

a first encoder for encoding each video frame of original video data by a first video coding scheme using both intra-frame coding and inter-frame coding, to obtain normal playback coded video data satisfying a prescribed normal playback bit rate;

a second encoder for selectively encoding each video frame in every N frames of the original video data by a second video coding scheme using only intra-frame coding, to obtain the fast playback coded video data satisfying a prescribed fast playback bit rate; and a control unit for synchronizing start and end of encoding by the first encoder and the second encoder so as to obtain the normal playback coded video data and the fast playback coded video data simultaneously.

15. The apparatus of claim 14, wherein the second encoder includes:
   frame extraction means for extracting each video frame in every N frames of the original video data; and
   encoding means for encoding each video frame extracted at the frame extraction means by the second video coding scheme.

16. The apparatus of claim 15, wherein the frame extraction means extracts each video frame in every N frames of the original video data on a basis of a number of entering frames counted in the second encoder.

17. The apparatus of claim 15, wherein the frame extraction means extracts each video frame in every N frames of the original video data on a basis of a prescribed time interval measured in the second encoder.

18. The apparatus of claim 14, wherein the second encoder includes:
   encoding means for encoding all video frames of the original video data by the second video coding scheme; and
   coded data extraction means for extracting each coded frame data in every N frames according to a header information provided in each coded frame data obtained by the encoding means.

19. The apparatus of claim 14, wherein the second encoder obtains the fast playback coded video data satisfying the prescribed fast playback bit rate by controlling a number of quantization levels used in encoding.

20. The apparatus of claim 14, wherein the second encoder obtains the fast playback coded video data with a fast playback bit rate equal to a normal playback bit rate of the normal playback coded video data obtained by the first encoder.

21. A method of video data playback in a video data playback system operable in a normal playback mode and a fast playback mode, the method comprising the steps of:
   (1) producing and storing normal playback coded video data encoded by a first video coding scheme using both intra-frame coding and inter-frame coding;
   (2) producing and separately storing fast playback coded video data for N times faster playback than a normal playback, where N is a natural number, which are encoded by a second video coding scheme using only intra-frame coding and having a playback bit rate and a frame rate identical to those of the normal playback coded video data produced and stored at the step (1); and
   (3) reproducing requested video data by switching coded video data to be reproduced between the normal playback coded video data produced and stored at the step (1) and the fast playback coded video data produced and stored at the step (2) according to a requested playback mode.

22. The method of claim 21, wherein the steps (1) and (2) include the steps of:
   (a) encoding each video frame of original video data by the first video coding scheme using both intra-frame coding and inter-frame coding, to obtain the normal playback coded video data;
   (b) decoding only each coded frame data in every N frames of the normal playback coded video data obtained at the step (a);
   (c) encoding every video frame decoded at the step (b) by the second video coding scheme using only intra-frame coding, to obtain the fast playback coded video data satisfying a prescribed fast playback bit rate.

23. The method of claim 21, wherein the steps (1) and (2) include the steps of:
   (a) encoding each video frame of original video data by the first video coding scheme using both intra-frame coding and inter-frame coding, to obtain the normal playback coded video data satisfying a prescribed normal playback bit rate;
   (b) selectively encoding each video frame in every N frames of the original video data by the second video coding scheme using only intra-frame coding, to obtain the fast playback coded video data satisfying a prescribed fast playback bit rate; and
   (c) synchronizing start and end of encoding at the step (a) and the step (b) so as to obtain the normal playback coded video data and the fast playback coded video data simultaneously.

24. A video data playback system operable in a normal playback mode and a fast playback mode, comprising:
   first means for producing and storing normal playback coded video data encoded by a first video coding scheme using both intra-frame coding and inter-frame coding;
   second means for producing and separately storing fast playback coded video data for N times faster playback than a normal playback, where N is a natural number, which are encoded by a second video coding scheme using only intra-frame coding and having a playback bit rate and a frame rate identical to those of the normal playback coded video data produced and stored by the first means; and
   third means for reproducing requested video data by switching coded video data to be reproduced between the normal playback coded video data produced and stored by the first means and the fast playback coded video data produced and stored by the second means according to a requested playback mode.

25. The system of claim 24, wherein the first means and the second means include:
   a first encoder for encoding each video frame of original video data by the first video coding scheme using both intra-frame coding and inter-frame coding, to obtain the normal playback coded video data;
   a decoder for decoding only each coded frame data in every N frames of the normal playback coded video data obtained by the first encoder; and
   a second encoder for encoding every video frame decoded at the decoder by the second video coding scheme using only intra-frame coding, to obtain the fast playback coded video data satisfying a prescribed fast playback bit rate.

26. The system of claim 24, wherein the first means and the second means include:
   a first encoder for encoding each video frame of original video data by the first video coding scheme using both intra-frame coding and inter-frame coding, to obtain the normal playback coded video data satisfying a prescribed normal playback bit rate;
   a second encoder for selectively encoding each video frame in every N frames of the original video data by the second video coding scheme using only intra-frame coding, to obtain the fast playback coded video data satisfying a prescribed fast playback bit rate; and
   a control unit for synchronizing start and end of encoding by the first encoder and the second encoder so as to obtain the normal playback coded video data and the fast playback coded video data simultaneously.

* * * * *